United States Patent [19]

Giroux et al.

[11] Patent Number: 5,412,647
[45] Date of Patent: May 2, 1995

[54] RATE ENFORCEMENT FOR FRAME RELAY NETWORKS

[75] Inventors: Nathalie Giroux, Hull; Marianne J. Morin, Ottawa; Marcel Lemay, Hull; Rungroj Kositpaiboon; Osama S. Aboul-Magd, both of Nepean, all of Canada

[73] Assignee: Northern Telecom Limited, Montreal, Canada

[21] Appl. No.: 37,151

[22] Filed: Mar. 25, 1993

[51] Int. Cl.⁶ .......................................... H04L 12/54
[52] U.S. Cl. .................................. 370/60; 370/85.6; 370/94.1
[58] Field of Search ............. 370/60, 60.1, 79, 84, 370/85.6, 94.1, 94.2

[56] References Cited

U.S. PATENT DOCUMENTS

| | | | |
|---|---|---|---|
| 5,130,986 | 7/1992 | Doshi et al. | 370/94.1 |
| 5,233,606 | 8/1993 | Pashan et al. | 370/85.6 |
| 5,278,828 | 1/1994 | Chao | 370/85.6 |
| 5,295,135 | 3/1994 | Kammerl | 370/17 |

OTHER PUBLICATIONS

"Frame Relaying Bearer Service—Architectural Framework and Service Description", Addendum to American National Standard for Telecommunications T1.606, Nov. 20, 1991.

Primary Examiner—Melvin Marcelo
Attorney, Agent, or Firm—Yoshiharu Toyooka

[57] ABSTRACT

A Frame Relay network must implement a rate (bandwidth) enforcement function at the access in the network so that service subscription violation by some users will not cause performance or throughput degradation of other users' service. A novel rate enforcement technique is disclosed. The new technique makes use of a "leaky bucket" algorithm in which a portion of one "leaky bucket" is set aside for high priority frames only.

8 Claims, 4 Drawing Sheets

RATE ENFORCEMENT FOR FRAME RELAY NETWORKS

FIELD OF THE INVENTION

The present invention relates generally to Frame Relay networks. In particular, it is directed to the technique of performing a rate (bandwidth) enforcement function for a terminal which is accessing the Frame Relay network.

BACKGROUND OF THE INVENTION

In response to the increasing demand for corporate data networking, network providers are offering Frame Relay service as a more economical alternative to private lines for metropolitan and wide area networking. Frame Relay service is currently defined with access speeds ranging from 56 Kb/s to 2 Mb/s, although the technology itself is can operate at higher speeds. In addition, Frame Relay service offers multiple Committed Information Rates (CIRs) and Excess Information Rates (EIRs) for Frame Relay connections. CIR is the rate (expressed in bits/sec) at which the network agrees to transfer information under normal conditions. The rate is measured over the measurement interval T. CIR is negotiated at call establishment or service subscription time. The high priority traffic of a connection can be guaranteed a throughput equal to the Committed Information Rates (CIR). Excess Information Rates (EIR) is defined to allow for some flexibility to support bursty traffic such as data. EIR is the rate at which the network will attempt to deliver. The Frame Relay network will ensure that low priority traffic will be discarded, if necessary, before high priority traffic. Low priority frames are identified by the Discard Eligibility (DE) flag set to 1, whereas high priority frames have the DE flag set to 0. High priority traffic in excess of the CIR will be carried as low priority traffic through the Frame Relay network and thus excess information frames may be marked discard eligible (DE) by the network. Frame Relay users may also generate low priority traffic.

As in other network services, the Frame Relay service requires congestion management to maintain quality-of-service (e.g., throughput, delay, probability of frame loss). In order to ensure that Frame Relay users adhere to the subscribed service bit rates (CIR and EIR) and that service subscription violation by some users will not cause performance or throughput degradation on other user's services, the Frame Relay network will have to implement a rate (bandwidth) enforcement function at the access into the network. This rate enforcement may be achieved by discarding frames (with preference to those marked as DE) during periods of congestion.

OBJECTS OF THE INVENTION

It is therefore an object of the present invention to provide a method and apparatus for conducting a rate enforcement function within a Frame Relay network.

It is a further object of the present invention to provide a method and apparatus for conducting a rate enforcement function using a "leaky bucket" algorithm within a Frame Relay network.

SUMMARY OF THE INVENTION

Briefly stated, one aspect of the present invention relates to a method of enforcing the rate at which a terminal is permitted to access the Frame Relay network system for exchanging information in high priority or low priority frames. The method comprises a step of receiving frames from the terminal in a first leaky bucket having a leakage rate $L_1$ and a bucket size $V_1$, a portion of which bucket size $V_1$ is set aside for receiving high priority frames only. The method has further steps of accessing the network by the first leaky bucket at the leakage rate $L_1$, receiving frames from the terminal in a second leaky bucket having a leakage rate $L_2$, and accessing the network by the second leaky bucket at the leakage rate $L_2$. There is a further step of sending overflowing frames from one bucket to the other.

Another aspect the present invention relates to an interface apparatus for enforcing the rate at which a terminal is permitted to access the Frame Relay network system for exchanging information in high priority or low priority frames. The apparatus comprises a first leaky bucket having a leakage rate $L_1$ and a bucket size $V_1$ for receiving frames from the terminal and for accessing the network at the leakage rate $L_1$. A portion of the bucket size $V_1$ is set aside for receiving high priority frames only. It also includes a second leaky bucket having a leakage rate $L_2$ for receiving low priority frames from the terminal and for accessing the network at the leakage rate $L_2$. The apparatus further has overflowing means between the first and second leaky buckets for sending overflowing frames from one bucket to the other.

BRIEF DESCRIPTION OF THE DRAWINGS

For a more complete understanding of the present invention and for further objects and advantages thereof, reference may now be made to the following description, taken in conjunction with the accompanying drawings, in which.

DETAILED DESCRIPTION OF THE PREFERRED EMBODIMENTS

Figure 1:
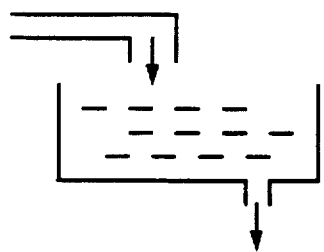
FIG. 1 is a schematic illustration of the operation of a "leaky bucket"
Figure 2:
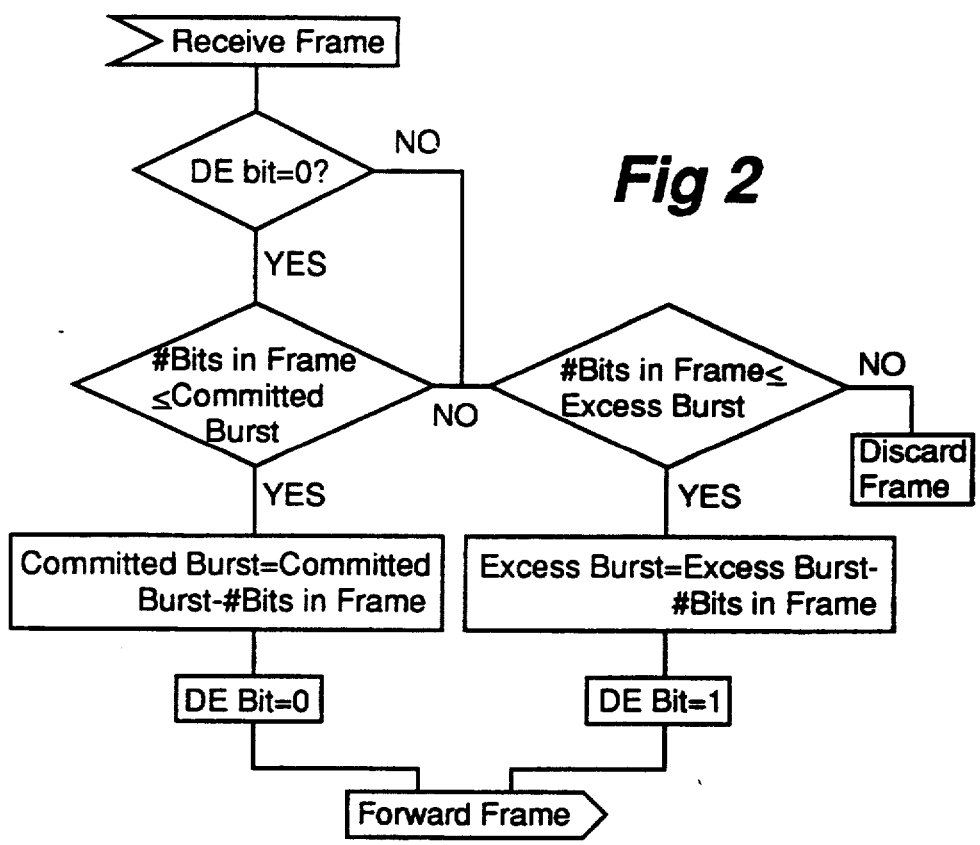
FIG. 2 is a flow chart of a scheme using a "leaky bucket" algorithm.

A class of algorithm, often referred to as "leaky bucket" algorithms, has been mentioned as a means for rate enforcement function. The "leaky bucket" is characterized by the bucket size and the rate at which the bucket is emptied. FIG. 1 illustrates the operation of the "leaky bucket". Data entering the network fills the bucket while a hole at the bottom allows the bucket to empty its content at a fixed rate. The bucket will begin to fill up whenever data entering the network is at a rate greater than the leakage rate. When the bucket is full, data is discarded. The flow chart of this scheme is shown in FIG. 2, in which the committed burst and excess burst are respectively the maximum amount of data that a network agrees to transfer and the maximum amount of uncommitted data that the network will attempt to deliver. The operation of this scheme guarantees that during any interval of length T, the amount of data entering the network does not exceed the sum of the bucket size and the leakage rate times the interval length T. Over a very long period, the maximum rate at which the data enters the network will converge to the leakage. Over short periods, however, this scheme permits bursts of a very high rate. The bucket size determines the burstiness of the transmission. The bigger the bucket size, the more bursty the traffic.

In an actual implementation, only the leakage rate need be specified by the user. The term Maximum Data Rate, instead of leakage rate, is generally used as it is more natural for the user to understand the meaning of this parameter.

Frame Relay standards propose to implement the bandwidth (rate) enforcement function using a double "leaky bucket" scheme, one for CIR and one for EIR. Two algorithms have already been proposed to implement the double "leaky bucket" scheme, the single sharing and the double sharing algorithm. The present invention relates to a new algorithm which can be called threshold sharing. The new algorithm is more flexible and more efficient than the two former.

Figure 3:
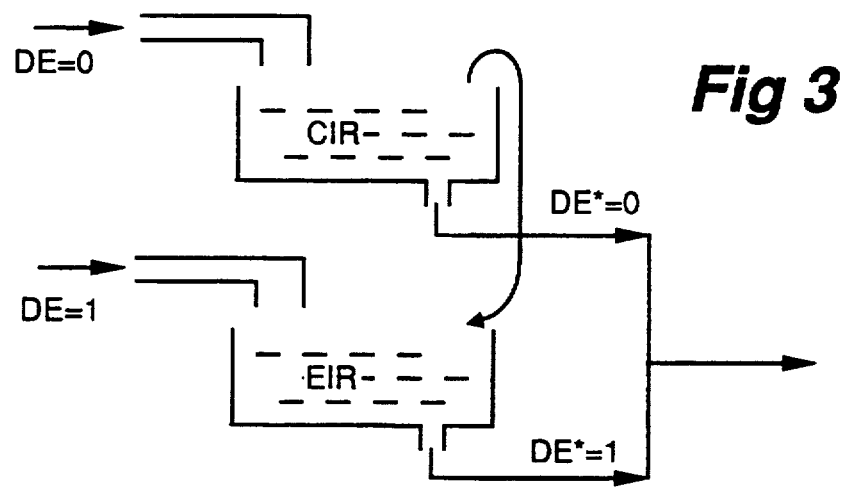
FIG. 3 is a schematic illustration of a single sharing a "leaky bucket" algorithm.

Referring to FIG. 3, the single sharing implementation allows all EIR "leaky bucket" credits to be used by high priority frames (DE=0) if the CIR "leaky bucket" does not have enough credits available for incoming high priority frames. On the other hand, none of the CIR "leaky bucket" credits can be used by incoming low priority frames. CIR and EIR "leaky buckets" can have the same or different leakage rates. In the Figure, frames entering the CIR and EIR buckets have their DE bits is set as shown. DE setting of frames coming out of the buckets is indicated as DE*. If there is not enough capacity in the CIR bucket to handle all the DE=0 frames, some DE=0 frames overflow into the EIR bucket which in turn exit as DE=1 (DE*=1) frames, provided that the total rate is within the subscribed value which is equal to the sum of CIR and EIR. The overflowing is shown schematically by a curved line with an arrow head.

Figure 4:
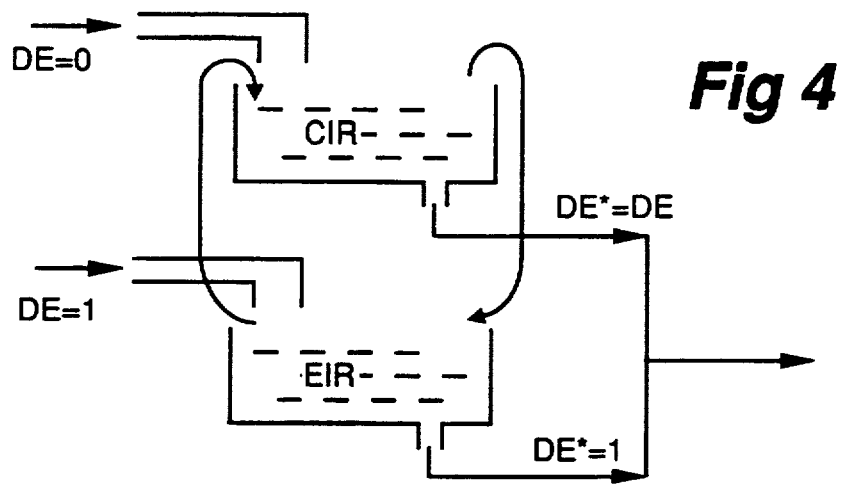
FIG. 4 is a schematic illustration of a double sharing a "leaky bucket" algorithm.

The double sharing implementation is shown in FIG. 4 and is similar to the single sharing implementation except that all of the CIR "leaky bucket" credits can also be used by incoming low priority frames if there are not enough credits in the EIR "leaky bucket". A frame entering as discard eligible (DE=1) will always exit as discard eligible (no change in DE settings), even though it has used the CIR bucket.

Figure 5:
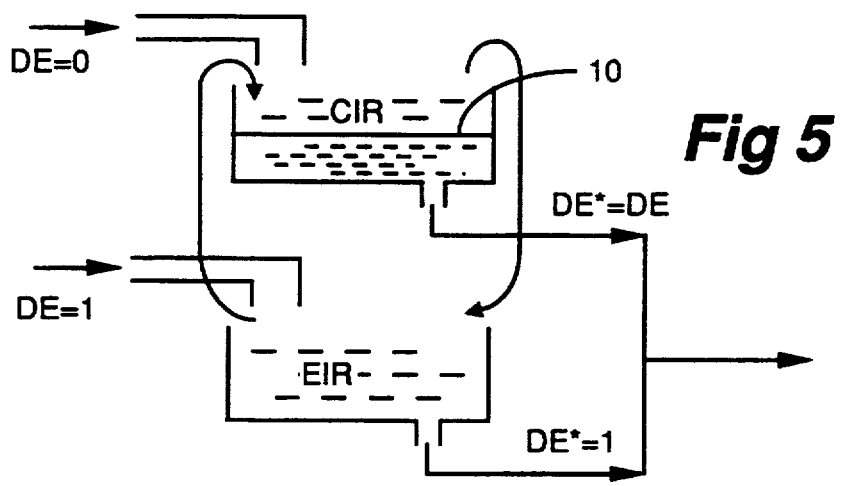
FIG. 5 is a schematic illustration of a threshold sharing a "leaky bucket" algorithm according to one embodiment of the present invention.

FIG. 5 illustrates schematically one preferred embodiment of the present invention. Implementation according to this embodiment is similar to the double sharing implementation except that only some of the CIR "leaky bucket" credits (bucket size) can be used by incoming low priority frames, if there are not enough credits in the EIR "leaky bucket". The CIR "leaky bucket" has the leakage rate $L_1$ and the bucket size $V_1$. The EIR "leaky bucket" has the leakage rate $L_2$. Therefore, a certain portion of the bucket size of the CIR "leaky bucket" is reserved for receiving high priority frames only. How much is set aside for DE=0 frames is determined by the sharing threshold designated by numeral 10. The threshold can be preset or adjusted at any time by an adjustable means or a software adjustment. As in the previous schemes, these leakage rates can be the same or different. Note that if the threshold is set at 100% sharing, it is equivalent to double sharing implementation. On the other hand, if the threshold is set at 0% sharing, it is equivalent to single sharing implementation. Thus, this implementation of the present invention has the flexibility of also supporting both single and double sharing schemes.

Figure 6:
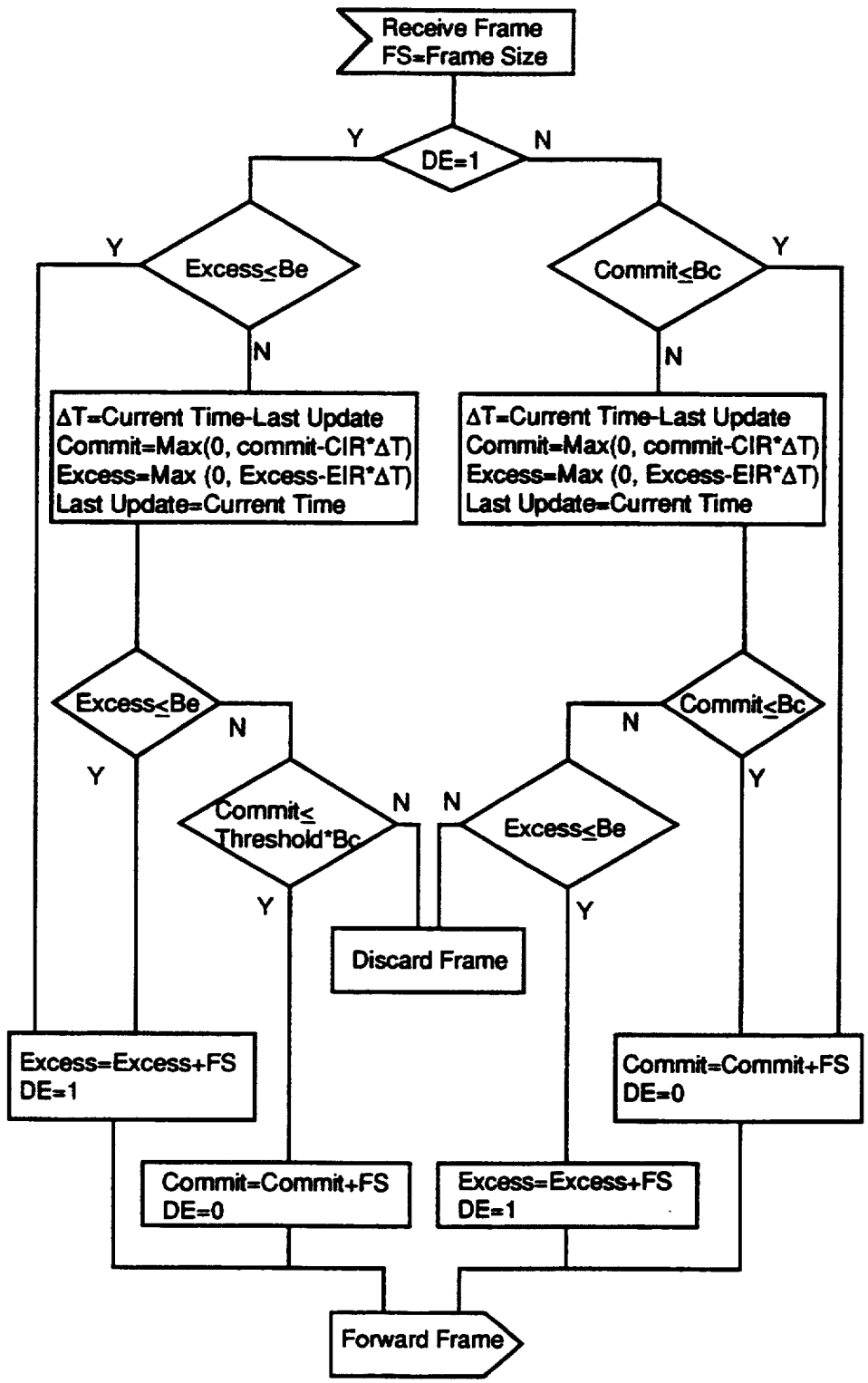
FIG. 6 is a flow chart of a scheme using the threshold sharing 37 leaky bucket" algorithm according to one embodiment of the present invention.

The flow chart for the algorithm is presented in FIG. 6. At initialization, the following values are set:
Be=Initial amount of token in EIR bucket;
Bc=Initial amount of token in CIR buckets;
Commit (current amount of token in CIR bucket)=0;
Excess (current amount of token in EIR bucket)=0;
Last Update=Current Update.

Figure 7:
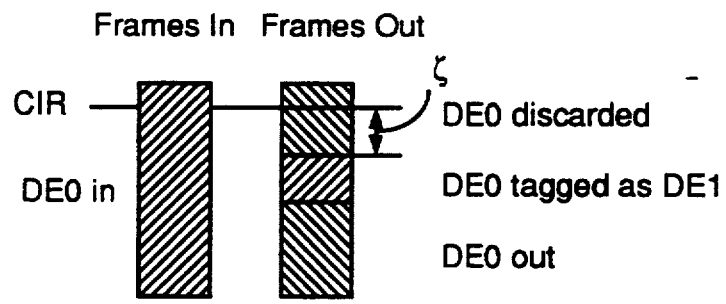
FIGS. 7–9 are charts showing the relationship among the quality-of-service parameters to be used for compliance measures of algorithms.
Figure 8:
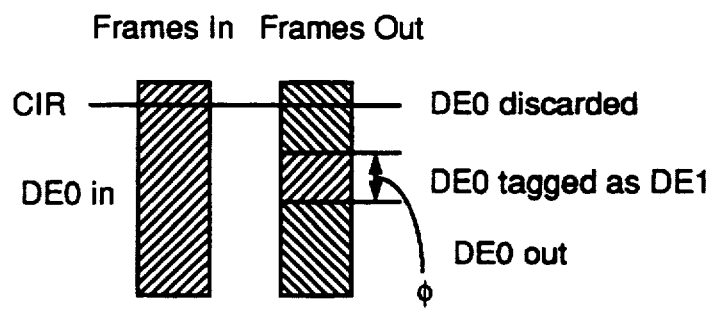
Figure 9:
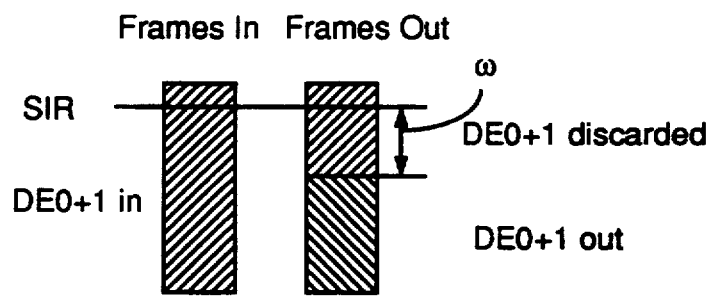

Referring to FIG. 7-9, three quality-of-service parameters are used to evaluate performance of the rate enforcement function to the negotiated parameters CIR and EIR. They are the excess tagging of DE=0 frames ($\phi$), the excess DE=0 frames discarded ($\zeta$), and the excess DE=0 and DE=1 frames discarded ($\omega$). These can be defined as follows:

$\zeta$—% of DE=0 frames that are discarded below the CIR limit;
$\phi$—% of DE=0 frames that are marked DE=1 below the CIR limit; and
$\omega$—% of DE=0 and DE=1 frames that are discarded below the CIR+EIR limit.

An algorithm is compliant if the $\zeta$ and $\phi$ parameters converge to 0 for any traffic mix and pattern.

Simulations were conducted for the three algorithms with different traffic mix and patterns to evaluate compliance with the quality-of-service parameters.

The single sharing algorithm complies with the $\zeta$ and $\phi$ parameters in all but extreme cases (where the DE=0 traffic is exactly equal to the negotiated CIR). However, the $\omega$ parameter does not converge when the DE=0 traffic is under the negotiated CIR and the total traffic exceeds the SIR (=CIR+EIR) limit.

The double sharing algorithm is compliant with the $\omega$ parameter, but in many cases, it does not comply with the $\zeta$ and $\phi$ parameters. This is because the DE=1 traffic is using the CIR token that should be guaranteed to the DE=0 traffic, therefore critical DE=0 traffic is lost when the DE=1 traffic exceeds the negotiated EIR value.

The threshold sharing algorithm according to the present invention complies with $\zeta$, $\phi$, and $\omega$ parameters in all but a few extreme cases (same case as for single sharing). While the threshold value is adjustable, the results are not very sensitive to it. It appears, however, that the threshold to 25% is adequate.

What is claimed is:

1. In a Frame Relay network system for exchanging information in high priority or low priority frames, a method of enforcing the rate at which a terminal is permitted to access the system, comprising steps of:

receiving frames from the terminal in a first leaky bucket having a leakage rate $L_1$ and a bucket size $V_1$, a portion of which bucket size is set aside for receiving the high priority frames only;

accessing the network by the first leaky bucket at the leakage rate $L_1$;

receiving frames from the terminal in a second leaky bucket having a leakage rate $L_2$;

accessing the network by the second leaky bucket at the leakage rate $L_2$; and sending overflowing frames from one of the two buckets to the other.

2. The method of enforcing the rate at which a terminal is permitted to access the system, according to claim 1, further comprising a step of:

setting a threshold at a predetermined percentage between 0 and 100% in the first leaky bucket so that the predetermined percentage of the bucket size $V_1$ is set aside for receiving the high priority frames only.

3. The method of enforcing the rate at which a terminal is permitted to access the system, according to claim 2, wherein the step of setting a threshold is to adjust the threshold in the first leaky bucket so that the portion of the bucket size $V_1$ is set aside for receiving high priority frames only.

4. The method of enforcing the rate at which a terminal is permitted to access the system, according to claim 3, wherein the threshold is set at 25% of $V_1$.

5. In a Frame Relay network system for exchanging information in high priority or low priority frames, an interface apparatus for enforcing the rate at which a terminal is permitted to access the system, comprising:

a first leaky bucket having a leakage rate $L_1$ and a bucket size $V_1$ for receiving frames from the terminal and accessing the network at the leakage rate $L_1$, a portion of the bucket size $V_1$ being set aside for receiving the high priority frames only;

a second leaky bucket having a leakage rate $L_2$ for receiving frames from the terminal and accessing the network at the leakage rate $L_2$; and overflowing means between the first and second leaky buckets for sending overflowing frames from one bucket to the other.

6. In a Frame Relay network system, an interface apparatus for enforcing the rate at which a terminal is permitted to access the system according to claim 5, further comprising:

threshold means for setting a threshold at a predetermined percentage between 0 and 100% in the first leaky bucket so that the predetermined percentage of the bucket size $V_1$ is set aside for receiving high priority frames only.

7. In a Frame Relay network system, an interface apparatus for enforcing the rate at which a terminal is permitted to access the system according to claim 6, further comprising:

adjusting means for adjusting the threshold in the first leaky bucket so that a portion of the bucket size $V_1$ is set aside for receiving high priority frames only.

8. In a Frame Relay network system, an interface apparatus for enforcing the rate at which a terminal is permitted to access the system according to claim 7, wherein the threshold is set at 25% of $V_1$.

* * * * *